United States Patent [19]

Gueldner

[11] 4,455,647

[45] Jun. 19, 1984

[54] APPARATUS FOR ESTABLISHING MULTI-ADDRESS CONNECTIONS

[75] Inventor: Enrique Gueldner, Coral Springs, Fla.

[73] Assignee: Siemens Corporation, Iselin, N.J.

[21] Appl. No.: 388,087

[22] Filed: Jun. 14, 1982

[51] Int. Cl.³ ............................................... H04J 3/12
[52] U.S. Cl. ........................................ 370/62; 370/85
[58] Field of Search ..................... 370/58, 67, 62, 85; 179/18 BC

[56] References Cited

U.S. PATENT DOCUMENTS

| | | | |
|---|---|---|---|
| 4,150,259 | 4/1979 | Fenton et al. | 179/18 BC |
| 4,203,001 | 5/1980 | Condon | 179/18 BC |
| 4,330,886 | 5/1982 | Fukuda | 370/62 |
| 4,340,775 | 7/1982 | Gesek et al. | 370/88 |
| 4,373,183 | 2/1983 | Means et al. | 370/85 |

*Primary Examiner*—Douglas W. Olms
*Assistant Examiner*—Frank M. Scutch, III
*Attorney, Agent, or Firm*—Karl F. Milde, Jr.; Andrew G. Rodau

[57] ABSTRACT

A digital data telecommunications system comprises a central switching system and a plurality of line terminators each connecting the switching system to a pair of incoming and outgoing lines and each designed to convert serial data transmitted along the incoming and outgoing lines into formatted message characters for transfer through the switching system, and vice-versa. Control data stored in a connection memory for the duration of a call enable the switching system to interconnect sequentially each calling line terminator with the respective called line terminator in a time multiplex mode for transmitting one message character at a time. An arrangement for establishing multi-address connections includes an additional line terminator connected to receive a character of a multi-address message from a calling line terminator across the switching system. A distributing data bus connects this line terminator in parallel to all line terminators entitled to receive a multi-address message. These receiving line terminators include control means for alternatively enabling the respective line terminator in a single address mode to receive a message character supplied by the switching system, and in a multi-address mode to receive serial data transmitted along said distributing data bus, respectively.

4 Claims, 10 Drawing Figures

X = DON'T CARE

APPARATUS FOR ESTABLISHING MULTI-ADDRESS CONNECTIONS

BACKGROUND OF THE INVENTION

1. Field of the Invention

The invention relates to a time-multiplex digital telecommunications system designed to provide simultaneous data transfer between respective ones of a multiplicity of pairs of subscribers across dedicated temporary communications links. Specifically, the invention is directed to an optional feature of such a telecommunications system concerning multi-address service wherein an authorized subscriber can transfer a message simultaneously to a selected group of subscribers connected to a central switching system of the telecommunications system.

2. Description of the Prior Art

Fully electronic computer-controlled switching systems for handling digital telecommunications services are well-known in the art. Such switching systems are flexibly designed for use in different applications, such as world-wide telex and gentex networks and may be used either as public or private data networks or as integrated networks. A telecommunications system of this type is described in U.S. Pat. No. 4,340,775. The central switching system of this telecommunications system is composed of modular hardware and software components. The hardware essentially comprises a central processing system and a communications hardware module. The central processing system performs the main control functions, especially for establishing through-connections between pairs of data terminals or subscribers, and for terminating such connections. The communications hardware module connects pairs of subscriber lines or trunk lines and controls time-multiplex operations during the transfer of messages between through-connected subscriber lines.

The communications hardware comprises a communications controller operating under program control of the central processor, terminator group controllers forming a logic interface between the communications controller and line terminators which provide the peripheral communication links to respective subscriber lines and trunk lines. The line terminators receive data at various speeds and in different codes and present formatted data to the communications controller and transmit output data to the associated subscribers or data terminals. The central processor system and other parts of the communications hardware are duplicated in the switching system for enhancement of reliability.

These hardware modules are supported by software modules, such as an operating system and a maintenance system. A control system module is the central and control-oriented part of the operating system and accomplishes central control functions. A switching system module provides all functions for switching-oriented operations and controls all phases of a connection beginning with an initial call request and ending with final clear-down and disconnect.

Such computer-controlled switching systems are designed to be easily adjustable to different kinds of applications for different uses. The desired flexibility requires a high level of switching capabilities for handling different kinds of high speed data traffic that is achieved by the variety of features and optional facilities, such as a manual switching position used for handling calls which require operator intervention. Another one of those optional features is a central distortion system, a test module comprising a distortion sender and a distortion receiver. When requested by a subscriber terminal, the distortion sender transmits test texts with different degrees of distortion to enable transmission facilities and teleprinters to be tested and adjusted. The distortion receiver analyzes on request by a subscriber terminal any texts transmitted from the subscriber to the central exchange and notifies the subscriber terminal of the degree of distortion measured.

In data telecommunications systems, in addition to establishing connections between pairs of subscribers, there is also a demand for the possibility of transferring data between more than two subscribers. This is then referred to as a multi-address connection. The term "multi-address connection" is intended to denote that a plurality of subscribers are each capable of receiving messages transmitted from an authorized subscriber.

In known switching systems, so-called multi-address circuits are provided for this purpose in the switching system which circuits receive the data transmitted by the calling subscriber. These circuits establish connections to called subscribers and connect the calling subscriber. The messages transmitted by the calling subscribers station then reach all other subscribers participating in the multi-address connection.

In U.S. Pat. No. 4,203,001 there is described an apparatus for establishing multi-address and conference call connections. The disclosed apparatus cooperates with a telecommunications system of the same type as described hereinbefore. Such a system does no longer employ separate multi-address circuits. Instead, this switching system comprises subscriber line terminators each associated with a subscriber station, and a connection memory arranged in the communications controller for storing control data. Storage cells constitute the connection memory, each of which storage cells is associated with a respective line terminator and contains control data which are required for the transmission of messages between interconnected subscribers. The control data are generated by the central processing system and are entered in a respective storage cell for the duration of a connection. A storage cell contains among other things a number of that particular line terminator which is currently cross-connected with the line terminator to which the storage cell is allocated. This enables the communications controller to operate independently from the central processing unit during the cross-connected phase of a connection.

The multi-address apparatus known from the U.S. Pat. No. 4,203,001 comprises, in addition to the line terminators interfacing incoming and outgoing lines, a series of additional line terminators, so-called multi-address terminators. Correspondingly, additional storage cells are provided in the connection memory which are associated with these multi-address terminators. The number of multi-address terminators and, hence, also the number of additional storage cells in the connection memory, depends upon how many subscribers in total are entitled to initiate multi-address operation in the switching system, on the one hand, and the maximum number of subscribers permitted to participate in a multi-address connection, on the other hand. To this end, the multi-address terminators are combined into groups corresponding in number to the subscribers entitled to initiate a multi-address connection. The first multi-address terminator of each group is connected with all of the following multi-address terminators within the group, such that a message character transmitted by the first multi-address terminator simultaneously reaches all additional multi-address terminators of that particular group. By virtue of an address of a normal subscriber line terminator entered into the storage cells associated with the multi-address terminators during the establishment of a connection, the same message character is always transmitted to different subscribers during the cyclic interrogation of the multi-address terminators.

Assuming that a reasonable percentage of subscribers should be authorized to participate in such a multi-address service, it is apparent that this optional feature will impose quite some outlay in hardware since each participating subscriber is then directly connected to a subscriber line terminator and, in addition, temporarily associated with one multi-address terminator. This approach also has some drawbacks from the systems point of view. The switching system is capable of servicing only a limited number of line terminators, and each line terminator card which is used for multi-address service limits the possible number of subscriber line terminators and, in consequence, the number of subscriber stations which can be connected to the switching system.

SUMMARY OF THE INVENTION

It is the object of the present invention to make possible a multi-address connection arrangement in combination with a digital data telecommunications system including a central switching system and a plurality of line terminators each connecting the switching system to a pair of incoming and outgoing lines transmitting serial data with various speeds and codes. Each line terminator is designed to convert the serial data into formatted message characters received and emitted by the switching system, and vice-versa. The switching system includes a connection control memory having storage cells each associated with a respective one of the line terminators. Each storage cell stores control data specifying the allocation between a calling line terminator and the respective called line terminator for the duration of a call. By means of these control data the switching system is enabled to connect sequentially each calling line terminator with the respective called line terminator in a time multiplex mode for transmitting one message character at a time.

A further object of the present invention is to utilize the various sections of a telecommunications system of the type above in an efficient manner by overcoming the limitation of the concept of the system which interprets any call connection as a temporary interconnection between a pair of line terminators.

Still a further object of the present invention is to provide a possibility for establishing multi-address connections requiring only a small amount of additional hardware, especially in view of further necessary interface means of the switching system, i.e. line terminators which are only used for this type of a connection.

A further object of the present invention is to provide an arrangement for establishing multi-address connections which require just minor adjustments within the switching system, such that a multi-address connection can be set up by use of existing procedures and can be handled in a time-saving manner without putting high load on the switching system.

These objects, as other objects which will become apparent from the description which follows, are achieved according to the present invention in an improvement constituting an arrangement for establishing multi-address connections, in combination with the central switching system of the type above. This improvement comprises an additional line terminator connected to receive a character of a multi-address message from a calling line terminator across the switching system, and having a serial output furnishing corresponding serial data. Furthermore, there is provided a distributing data bus connecting the serial output of this additional line terminator in parallel to all line terminators entitled to receive a multi-address message. These receiving line terminators, in turn, include control means for alternatively enabling the respective line terminator in a single address mode to receive a message character supplied by the central switching system and to convert the same into serial data for emitting the same to the respective outgoing line, and in a multi-address mode to receive serial data transmitted along the distributing data bus, respectively, for transfer to the outgoing line.

A main advantage of this arrangement is that for a multi-address connection just one additional line terminator is necessary which communicates simultaneously with all receiving line terminators. A multi-address connection, as seen from the switching system, appears to be like any other connection in the cross-connection phase. This is specifically advantageous for two reasons: one line terminator still can be spared for the additional and optional multi-address feature of the switching system without limiting the switching capabilities to an unreasonable extent; and the distributing data bus directly connecting this additional line terminator to all line terminators entitled to receive a multi-address message avoids the need of transferring the same message character more than once through the switching system in order to reach all receiving line terminators. Therefore, the number of line terminators authorized to receive such a multi-address message can be flexibly site-selected with regard to a specific application or a customer's requirement and this number has no impact on the data traffic handled by the switching system.

This multi-address arrangement, furthermore, is as flexible as to be integrated into other optional facilities of the telecommunications system or to be combined with off-line subsystems of the telecommunications system.

In a preferred embodiment of the invention the multi-address arrangement is combined with a central distortion system which forms an off-line subsystem connected to the switching system and is designed to distort incoming serial data in accordance with various discrete distortion levels ranging from zero to full distortion under control of a central processing system forming a part of the switching system. This central distortion system is arranged between the additional line terminator and the distributing data bus and is utilized for transmitting both a multi-address message and a distorted text with the difference that a multi-address message is always directed to more than one line terminator and these receiving line terminators are forced by the central processing system to assume the multi-address mode, whereas the transmission of a distorted text is requested by a receiving line terminator.

In this preferred embodiment of the present invention the additional hardware necessary for establishing a multi-address connection and a connection for transmitting specifically distorted text data to a subscriber is kept to a minimum. This is above all of advantage in view of the fact that only a limited number of line terminators can be connected to the switching system because of the real time switching conditions and the used technology. It is furthermore of advantage that a test data request by a calling subscriber and its associated line terminator has low priority, whereas a multi-address message often is assigned a higher priority. The combined use of one subsystem, therefore, does not create a priority conflict or does not have a limiting effect on the switching capabilities of the telecommunications system.

These different embodiments described hereinbefore present examples for the flexibility of the basic design concept which allows for a variety of adjustments in accordance with improvements, changes and optional features of the switching system of the digital telecommunications system and which will become more apparent from the following detailed description.

BRIEF DESCRIPTION OF DRAWINGS

A better understanding of the invention may be had by reference to this following description of a preferred embodiment in conjunction with the accompanying drawings.

DESCRIPTION OF THE PREFERRED EMBODIMENT

Figure 1:
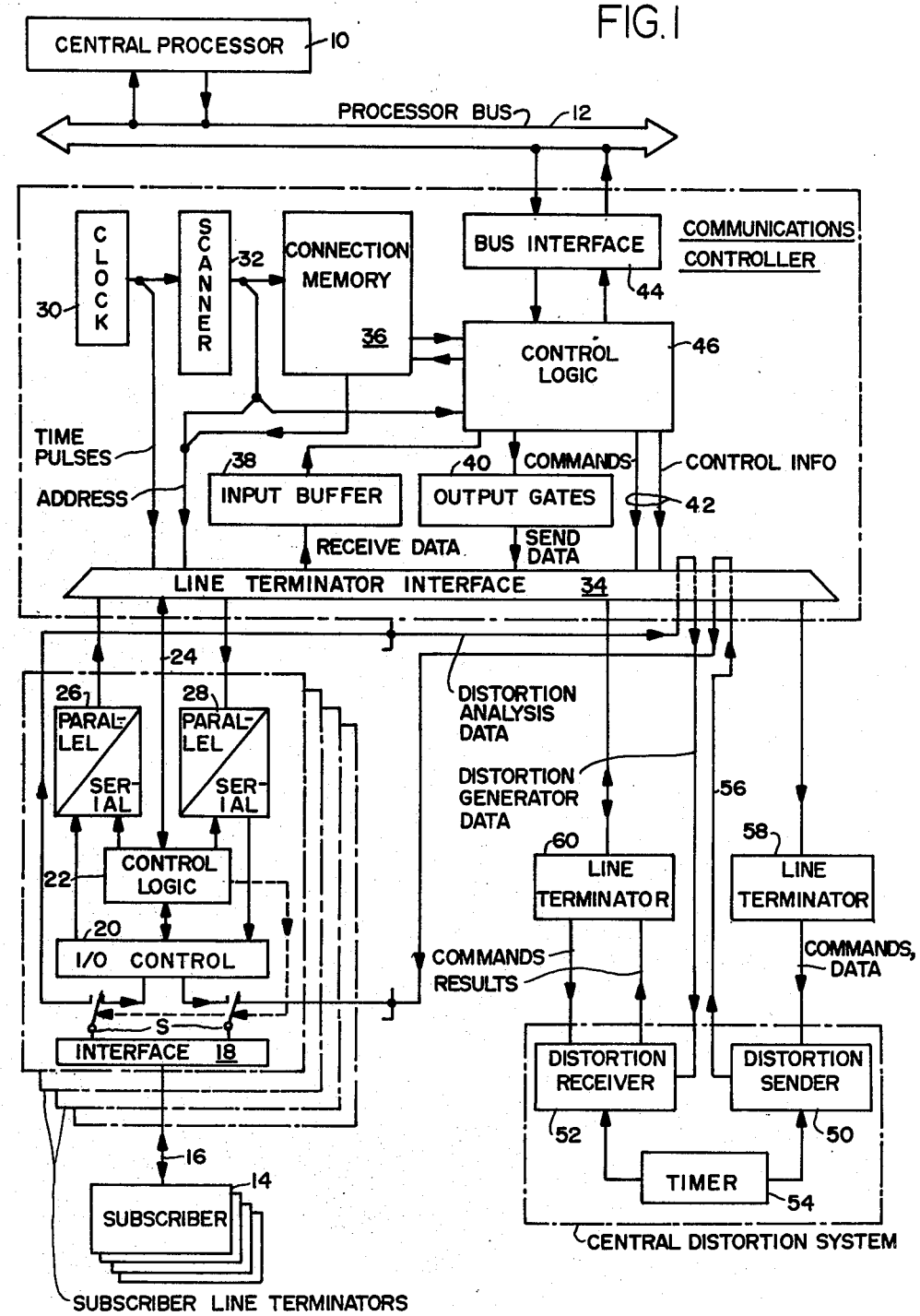
FIG. 1 shows a basic block diagram of a conventional digital telecommunications system including a switching system and a plurality of line terminators each arranged between the switching system and a respective pair of incoming and outgoing lines connected to a respective subscriber. The block diagram, in addition, represents an optional off-line subsystem forming an arrangement for establishing multi-address messages, in combination with a central distortion system, comprising a separate timer unit, a distortion sender and a distortion receiver.

The Central Exchange (FIG. 1)

The block diagram shown in FIG. 1 schematically represents a time multiplex digital telecommunications system with switching capabilities for handling digital communications services. It includes a central processor system represented by a central processor 10 and a processor bus 12 and performing the main control functions, especially for establishing through-connections between pairs of data terminals which are indicated as subscribers 14, and for terminating such connections.

A communications controller connects subscriber lines or trunk lines to the central exchange and controls time-multiplex operations during the transfer of messages between through-connected subscribers. The communications controller operates on program control of the central processor and communicates with the subscribers 14 across peripheral communication links, so-called subscriber line terminators. A line terminator receives data from its connected subscriber 14 across a subscriber line 16 in bit-serial form at various speeds and in various codes, converts it into bit-parallel characters and presents such characters to the central communications hardware for transfer to the central processor 10 or to a called line terminator. In the opposite direction, the line terminator receives bit-parallel characters and sends them to a connected subscriber 14 in bit-serial form.

Each line terminator includes a line interface unit 18 which receives single or double current signals from the connected subscriber or trunk line and converts the trunk levels to logic levels for an input/output control unit 20.

For signal transfer in opposite direction, the interface also converts the logic signals received from the input-/output control 20 to the single or double current signals which are forwarded to the connected subscriber 14. The input/output control 20 provides the correct continuous condition that is, start polarity (space) or stop polarity (mark) in the free-line and also in the call-connected phase.

The input/output control unit 20 is connected to a control logic unit 22 which receives control commands, clock pulses and strobe pulses (enable pulses) from the communications controller via control lines 24. The control logic unit also sends control information and status signal to the communications controller via dedicated ones of those control lines 24. The coded commands operate on the information received from or transferred to the communications controller and are forwarded in the call set-up and clear down phases to the central processor 10 or from the central processor to the control logic unit 22, respectively.

Each line terminator also includes a serial/parallel converter 26 and a parallel/serial converter 28. The former converter accepts anisochronous, bit/serial input data from the input/output control 20 and checks the received characters for correct polarity of the start and stop elements. The data characters are transferred to the communications controller in bit-parallel format with start and stop elements removed. The parallel/serial converter 28 accepts the characters in bit-parallel format sent by the communications controller and converts them into bit-serial characters for transfer to the input/output control unit 20, the converter adds the start and stop elements before passing them on to the input/output control. Both converters operate under control of the control logic unit 22 and are switchable under program control to enable them to handle characters with different transmission speeds, codes and start/-stop element lengths.

The communications controller, the nucleus of the communications hardware, serves as the interface between line terminators and the central processor 10. It includes a line terminator interface unit 34 which is used for data and control signal transfer to and from the line terminators. A clock unit 30 furnishes the timing pulses necessary for each line terminator for the reception and transmission of signalling information and data at the correct transmission speed on the connected subscriber and/or trunk lines and a time base for a scanner 32 which converts this pulse into consecutive binary addresses. Each address marks a line terminator which is intercepted. When the scanner detects a line terminator having information to be transferred to another line terminator or to the central processor 10, sequential scanning is stopped to allow the communications controller to transmit the information, whereupon the scanner assumes the sequential scanning operation. Furthermore, the communications controller is provided with a connection memory 36 for storing cross-connect control information. Each memory word is associated with a respective one of the line terminators and contains the address of a currently cross-connected line terminator and line-specific control and status information of the associated line terminator, as well. During the set-up phase of a call the central processor 10 enters the address of the called line terminator into the memory word associated with the calling line terminator and the address of the calling line terminator into the memory word associated with the called line terminator. This is the basic control information enabling the communications controller to control data transfer between line terminators during the cross-connect phase independent from the central processor 10.

An input buffer 38 of the communications controller stores information received from a line terminator and designated for transfer either to another line terminator or to the central processor 10. A stored data character is retransmitted at the correct time to the receiving subscriber via output gates 40. Appropriate bit combinations on command lines 42 inform the line terminator simultaneously as to whether the received character is to be interpreted as a control character or as information to be sent to the line.

The communications controller includes further interface devices, designated as bus interface 44, for exchanging data with the central processor system. These interface devices include a direct memory access (DMA) interface and a general interface. The DMA interface provides logic and the buffered switches necessary for a direct transfer of status information and data received from the line terminators to a main memory of the central processor 10 system.

The general interface provides the logic and the buffers necessary for a program-controlled transfer of information between the central processor 10 and the line terminators across the communications controller. This interface also includes logic and buffers for program interrupts to be initiated by the communications controller necessary for processing call-specific information.

The main control functions of the communications controller are achieved by means of a control logic 46 which contains all circuitry necessary for controlling the flow of data between line terminators and for the exchange of status information and data between a line terminator and the central processor 10. Data received from a scanned line terminator are first stored in the input buffer 38. At the time of such information transfer, the control logic 46 reads in the connection memory 36 the memory word associated with the marked line terminator and extracts from it the address of the connected line terminator. The control logic then sends the contents of the input buffer 38 to this line terminator via the output gates 40.

The switching system also may include various optional facilities. One of these facilities is a central distortion system, an independent off-line peripheral line-condition analysis system, supplying subscribers with distorted test data for determining message reception quality and analyzing message transmission quality. This sub-system, schematically represented in FIG. 1, includes a distortion sender 50, a distortion receiver 52 and an independent timer 54.

The distortion sender 50 is designed to provide distorted data to one or many subscribers, the number of subscribers being dependent upon the number of subscribers connected to a distortion generator data bus 56. When requested by a subscriber terminal, the distortion sender 50 transmits test data with different degrees of distortion, this data enabling the testing and adjusting of transmission facilities and teleprinters. One or more distortion receivers 52 may be used to analyze data received from subscribers requesting analysis, since only one subscriber can be serviced at a time by one distortion receiver. The distortion receiver receives a request from a connected subscriber terminal, analyzes the received data and notifies the subscriber terminal of the degree of distortion measured.

The distortion sender 50 and the distortion receiver 52 communicate with the communications controller across separate line terminators 58 and 60. This enables a subscriber to request distortion test service just by dialing a specific number. The subscriber dials a predetermined number which alerts the communications controller and the central processor 10 that a subscriber requires the service "send distortion data". If the distortion sender 50 is not already busy responding to a previous request by another subscriber, pre-stored test data is placed on the distortion generator data bus 56 and is sent via the communications controller to a subscriber. As indicated in FIG. 1, the distortion generator data bus 56 is hard-wired through the line terminator interface 34 and is commonly connected to all line terminators associated with the subscribers 14 enabled to obtain this service. A switch S arranged in each line terminator and connected to the internal input line of the interface 18 which enables this interface unit to receive serial data either from the input/output control unit 20 or from the distortion generator data bus 56. The operation of the switch is controlled by the control logic 22 and enables the line terminator to assume either a normal data transfer mode for receiving data from the communications controller across the parallel/serial converter 26 and the input/output control unit 20 or a distortion mode for receiving serial data across the distortion generator data bus 56.

If a subscriber requests a distortion test when the distortion sender 50 is already busy transmitting test data, such a service request is put in a waiting queue until the currently transmitted test data has been completely sent. Then the distortion text is sent to all waiting subscribers of the same speed and code simultaneously. In this way, no subscriber receives only a part of the test data.

Details of the distortion sender 50 and its functional characteristics will become more apparent from the description below. Meanwhile, it may be indicated that the distortion sender receives pre-formatted data across the associated sending line terminator 58 and distorts it according to control information specified by commands generated by the central processor 10.

Since distortion analysis in itself is not of major importance in view of the present invention just a general overview will be given. With respect to telegraph signal distortion, the instant of transition from a current pulse to a no-current interval and vice-versa is termed the "characteristic instant", also called the "pulse step". At the telegraph speed of 50 baud, the characteristic instance of the telegraph signals should coincide with the time slots 20, 40, 60, 80, 100 and 120 ms. The zero point of the time slot pattern is identical with the pulse step of the start pulse.

Disturbances within the transmitter and on the transmission path may cause the characteristic instances to be displaced. Some of the characteristic instances occur earlier than they should, i.e. they are leading, others occur later, i.e. they are lagging. The former case designates early distortion and the latter case represents late distortion. Maximum displacements of the characteristic instance can be measured within a given period of time. Such values are expressed as a percentage of the pulse length and determine a percentage of early or late distortion. This will be explained later in more detail. The distortion sender 50 is designed to distort a message received across the sending line terminator 58 under program control in accordance with specified percentages, and to furnish such distorted data to a requesting subscriber for testing the subscriber's performance.

Any subscriber can also request transmitted data to be analyzed for distortion. This time, the subscriber dials the select number of the distortion receiver 52, and the distortion receiver, when available, is controlled by the central processor 10 to start analysis. The distortion receiver sends a request to the calling subscriber, the answer of the subscriber is analyzed and the results are retransmitted to the subscriber via the receiver's line terminator 60.

The units designed to generate distorted test data are of major concern in conjunction with the present invention. Therefore, a more detailed description of the timer unit 54 and of the distortion sender 50 of the distortion system will be given in the following.

Figure 2:
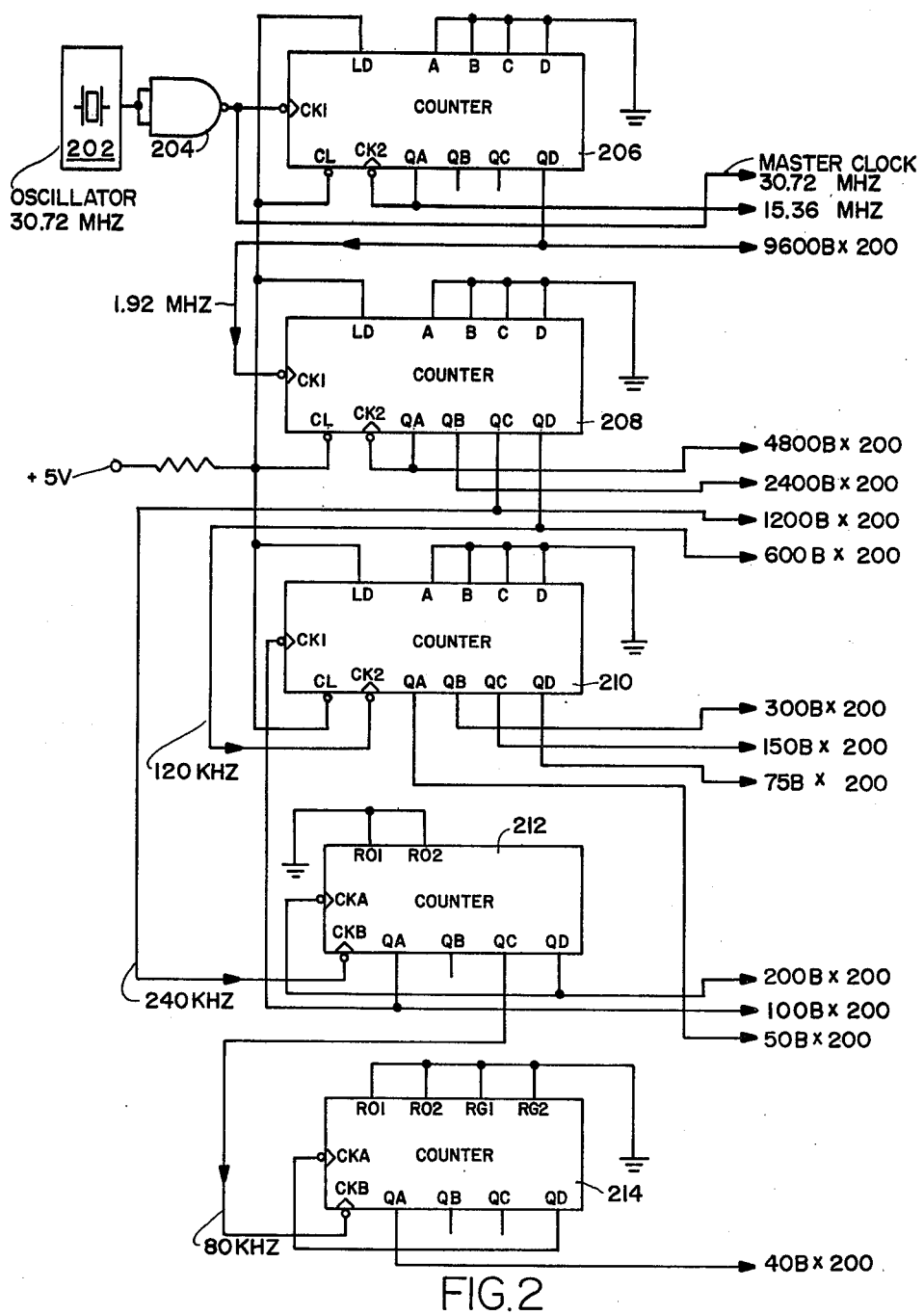
FIGS. 2 and 3, in combination, represent detailed block diagrams of this timer unit.
Figure 3:
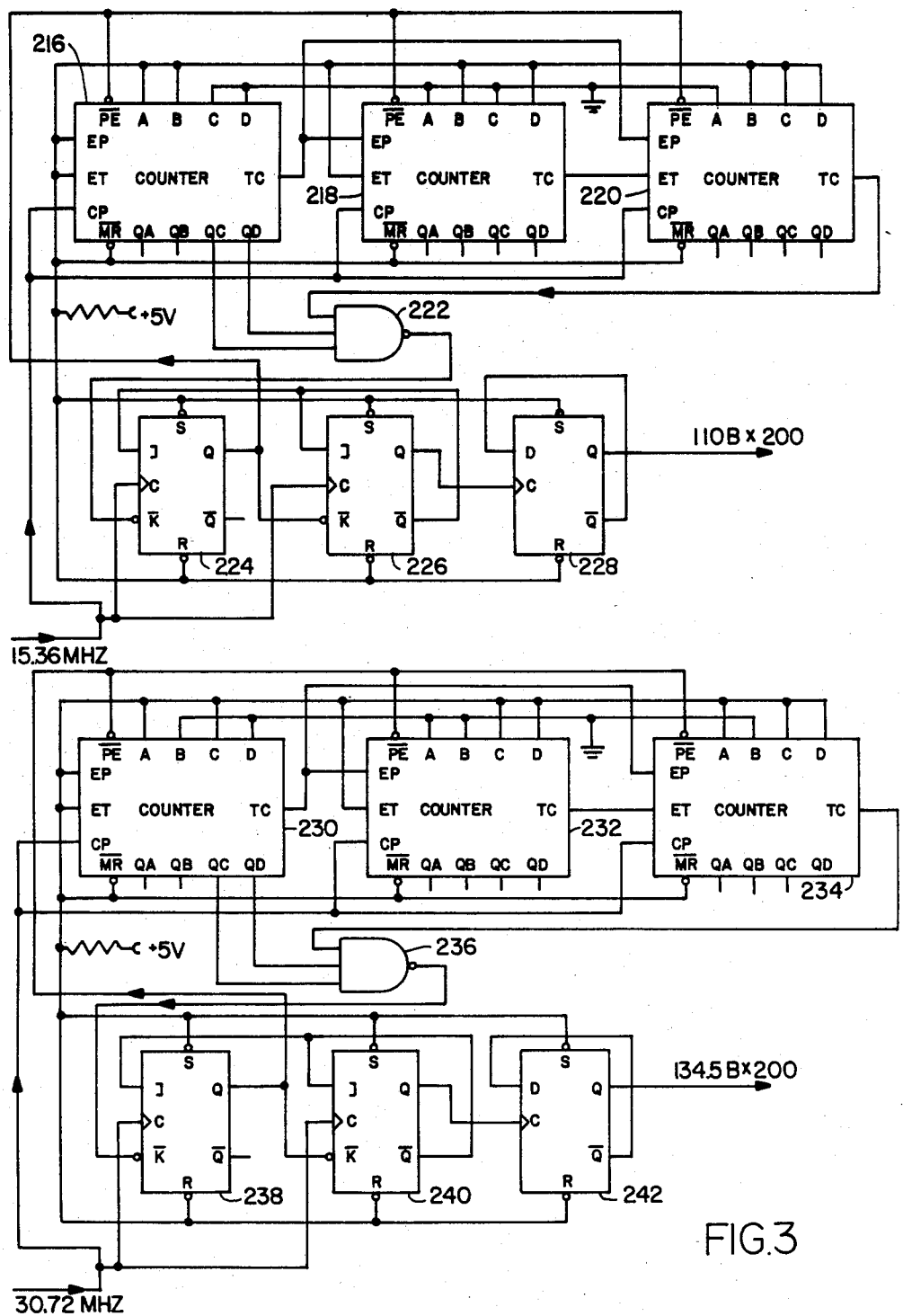

The Timer of the Distortion System (FIGS. 2 and 3)

It has been indicated that the central distortion system can operate at various speeds and codes. For this reason, the timer 54 is provided for generating all clock signals necessary for the operation of the distortion sender 50 and the distortion receiver 52. For each of the operational baud rates, the timer derives two clock signals which are 16 times higher and 200 times higher, respectively than the associated baud rate. These clock signals are designated as x16 signals and x200 signals, respectively. The x16 signals are necessary to operate receiver and transmitter devices of the distortion sender 50 and the x200 signals determine the performance characteristic of the distortion receiver 52, in other words, these clock pulses are necessary to obtain the accuracy of the distortion receiver.

A part of the logic circuitry of the timer unit 54 is shown in FIGS. 2 and 3. FIG. 2 represents a master oscillator of conventional design which generates a 30.720 MHz symmetrical master clock pulse train. All clock signals are derived from this master clock. The timer 54 furthermore comprises a plurality of counter-divider circuits and buffers to provide timing for the associated distortion sender 50 and the distortion receiver 52. The derived clock signals fall into two groups:

(1) clock pulses having a clock pulse rate being 200 times higher than the corresponding baud rate and generated for controlling the analysis operation of the distortion receiver 52, and (2) clock signals having a clock pulse rate 16 times higher than the corresponding baud rate and generated for controlling the transmitter and receiver sections of the distortion sender 50 and the distortion receiver 52.

The respective counter-divider circuits and buffers of the timer for both groups of clock pulses are quite similarly constructed and of conventional design. For this reason, just one section showing the circuitry for deriving the first group of clock pulses is represented in detail in FIGS. 2 and 3.

The master oscillator 202 is buffered from the dividing circuitry by a buffering NAND gate 204. A first binary count 206 is directly triggered by the master clock pulse of 30.72 MHz. This first counter 206 comprises a conventional integrated circuit SN74S 197 manufactured by Texas Instruments and is wired to provide a divide-by-2 output of 15.360 MHz and a divide-by-16 output of 1.920 MHz which furnishes the clock signal 9600 B×200. A first clock input of a second binary counter 208 constructed from the same integrated circuit is connected to the 15.360 MHz clock pulse and provides divide-by-two, divide-by-four, divide-by-eight and divide-by-sixteen outputs which carry a group of four further clock pulses associated with 4800 B, 2400 B, 1200 B and 600 B, respectively. A third binary counter 210 identically designed to the previous ones provides a divide-by-two output, a divide-by-four output and a divide-by-eight output furnishing the next group of clock signals corresponding to baud rates 300 B, 150 B and 75 B, respectively. An independent divider circuit of the third binary count derives a 10 KHz clock pulse corresponding to 50 B.

The next two counter stages 212 and 214 are composed of divide-by-12 counters comprising commercially available integrated circuits SN 74 LS 92 A and SN 74 LS 98 manufactured by Texas Instruments. The fourth counter 212 divides the 240 KHz clock signal by 6 to yield 40 KHz which corresponds to a 200 B×200 clock signal and divides that signal to give 20 KHz which corresponds to 100 B×200 and also provides a trigger input to the third binary counter for the independent divider circuit. The fifth binary counter 214 receives an 80 KHz trigger signal from the fourth counter and is wired to divide this input signal by 5 and by 2 to yield an 8 KHz clock pulse which corresponds to 200×40 B.

The circuit design for generating the remaining two clock signals of the first group of clock signals is shown in FIG. 3. These clock pulse signals are directly derived from the master clock pulse and the 15.360 MHz signal. In each section the input clock pulse is divided by a divide-by-N circuit comprising three synchronous 4-bit counters composed of SN 74 S 163 circuits manufactured by Texas Instruments. These three binary counters 216, 218 and 220, respectively of the upper section are wired such that a division ratio 1/N is achieved, wherein N=349; as can easily be derived from the hardwired high and low connections of the data inputs. These fixed connections determine a preset condition of 4.096−3747=349 in binary code.

A NAND gate 222 connected by its input to the ripple carry output TC of the binary counter 220 and the outputs $Q_C$ and $Q_D$ of the binary counter 216 allows for a glitch-free reset by decoding the N−3 count and by triggering a modulo−3 reset circuit comprising two master-slave flipflops 224 and 226, respectively. Since the output of the second master-slave flipflop 226 is not symmetrical, a D flipflop 228 is provided for dividing the output signal of the second master-slave flipflop 226 by 2. The D flipflop 228 furnishes a symmetric 22 KHz pulse, which pulse corresponds to the 110 B×200 clock signal.

The lower section of FIG. 3 shows a similar circuit design comprising three further binary counter 230, 232, 234, a decoding NAND gate 236, two master-slave flipflops, 238 and 240 and a D flipflop 242.

This divider circuitry derives from the master clock pulse 30.720 MHz in a similar manner a symmetric output pulse of 26.9 KHz representing the 134.5 B×200 clock pulse. The layout of the circuitry is identical to the aforementioned divider section, except for different hardwired low and high connections of the data inputs of the three binary counters 230, 232 and 234. These connections determine a pre-setting of these binary counters which in combination with the wiring of the enable inputs EP and the reset inputs MR determine a divide-by-N circuit, wherein N=571. This value can be derived in the same manner as outlined above with respect to the upper section. The high-frequency 16×baud rates are derived by a standard counter/divider chain which is similar to corresponding circuitry described above in conjunction with FIG. 2. Two further sections of divide-by-N circuits similar to those shown in FIG. 3 are used to derive the lower frequency baud rates of 110 B×16 and 135B×16. Since such clock divider circuits are very well known in the art and examples of corresponding circuits have been represented in FIGS. 2 and 3 no further presentation of schematics and detailed description is deemed to be necessary.

Figure 4:
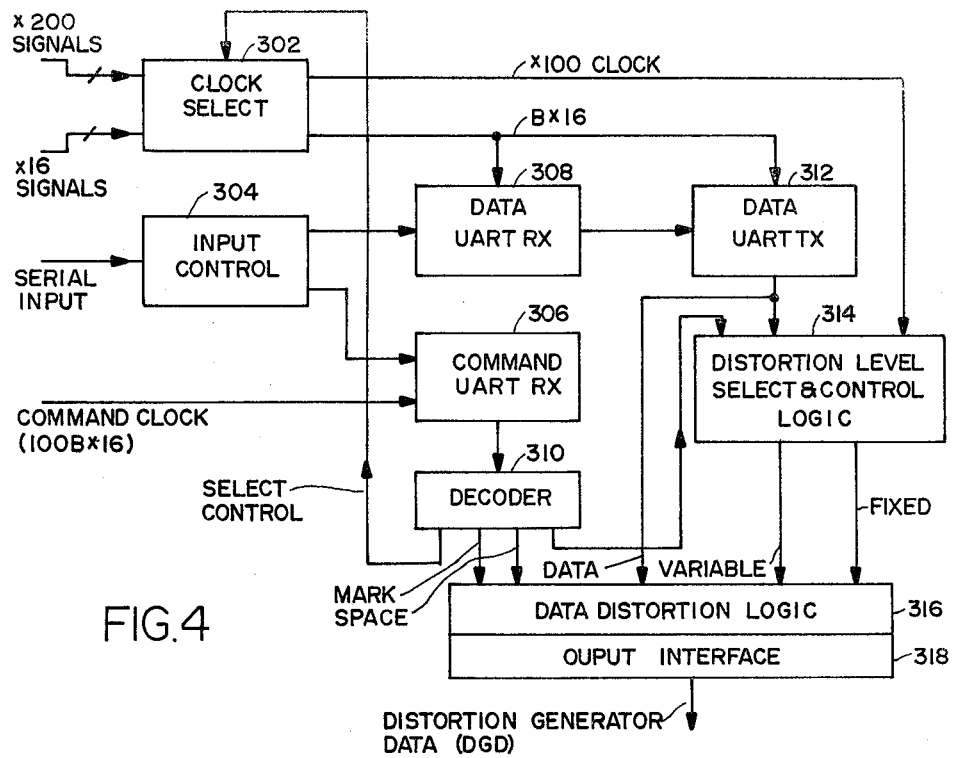
FIG. 4 represents the major sections of the distortion sender in the form of a block diagram.

The Distortion Sender (FIG. 4)

Operation of the distortion sender 52 will be described in more detail in the following on two levels. The first level is keyed to a simplified block diagram shown in FIG. 4 representing the basic concept of the distortion sender. This description is followed by schematics which represent sections of the distorted sender in more detail.

FIG. 4 represents a clock select unit 302 which receives in parallel the various clock signals generated by the timer 52 described above. For simplification two groups of input signals are shown and designated ×200 signals and ×16 signals, respectively. The clock select unit 302, furthermore, receives an internal select control signal to be described later in more detail which signal triggers the selection of specific ones of the clock input signals in accordance with the speed of a subscriber requesting distortion test service. Another input signal to the distortion sender is a command clock signal which is identical with the 100 B×16 signal and is also furnished by the timer 52.

An input control unit 304 receives serial input data from the sending line terminator associated with the distortion sender 50. This input control unit 304 is connected to two universal asynchronous receiver/transmitter (UART) circuits designated as command UART 306 and data UART 308. The input control unit 304 accepts the first two valid words transmitted from the communications controller across the sending line terminator 58 as commands to be forwarded to the command UART 306. These two command words are decoded by a decoder 310 into MARK, SPACE, DISTORTION LEVEL and CLOCK SELECT signals. The first two signals determine early or late distortion, the distortion level signals determine the relative distortion of the message to be sent to the requesting subscriber and the clock select signals specify the baud rate to be selected, which baud rate corresponds to the transmission speed of the requesting subscriber.

After receipt of two command words, the input control unit 304 automatically redirects the incoming data stream to the data UART 308 which is connected to a further data UART 312. Both universal asynchronous receiver/transmitter circuits are connected transmitter-to-receiver to generate a zero distortion data stream. Both the first and second data UART 308 and 312, respectively, are triggered by a common clock pulse which is dependent upon the desired baud rate. In accordance with the design of conventional UART's this clock pulse must be 16 times the desired baud rate, as indicated by a corresponding reference symbol B×16. This clock pulse is an output pulse of the clock select unit 302 and its actual pulse rate accordingly is dependent upon the baud rate specified by the previous distortion sender command code.

The serial output data of the second data UART 312 is used by a distortion level select and control logic 314 to generate VARIABLE DATA and FIXED DATA signals. These signals together with the mentioned MARK and SPACE signals are used by a data distortion logic 316 to distort the incoming data stream to the predetermined distortion level set by the previously received command. The output data which are buffered in an output interface 318 and fed to the distortion sender bus 56 represent the distortion generator data.

Figure 5:
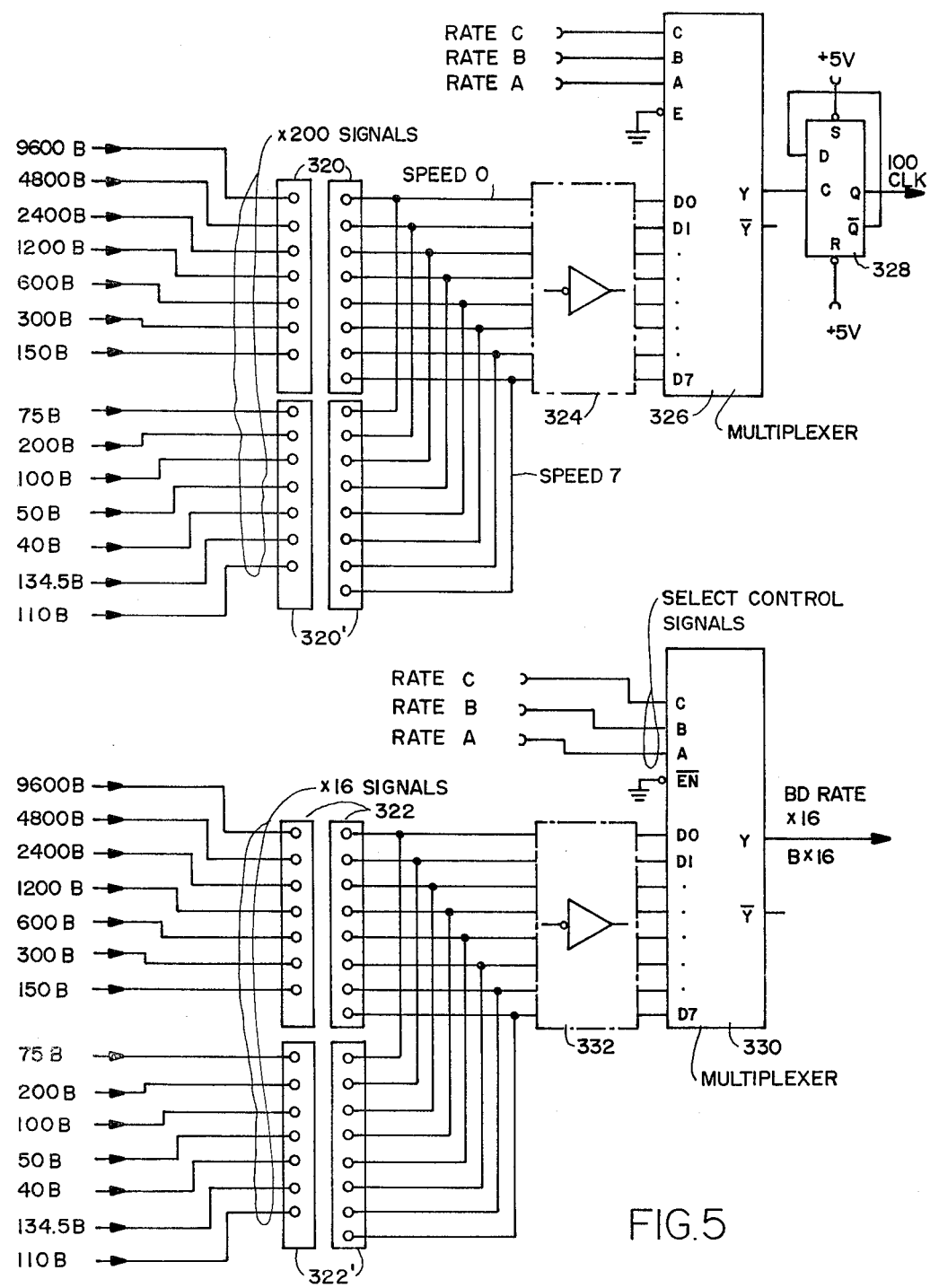
FIG. 5 represents a circuit diagram of a clock select unit forming one section of the distortion sender.

FIG. 5 represents the layout of the clock select unit 302 in more detail. At the left hand margin of the drawing two groups of input signals are shown which represent the ×200 signals and ×16 signals, respectively. These signals correspond to the entire range of baud rates from 9600 B down to 50 B which can be handled by the central exchange. Out of this wide range of possible transmission speeds, eight speeds can be preselected using a set-up structure of hand-wired headers which are schematically indicated and referenced 320, 320' and 322, 322'. By connecting one input connector to a respective one of the output connectors of the headers, each of the incoming clock signals can be related to a specific output line of a header, thus determining the relationship between incoming clock signal and a distortion system speed level. One possible connection scheme is indicated at header 320 by dotted lines. This connection scheme indicates that SPEED ZERO is associated with either a 9600 baud rate or a 75 baud rate. If headers 320 and 320' are programmed in this manner, headers 322 and 322' have to be wired accordingly.

Respective output lines of headers 320 and 320' are commonly connected across individual buffering devices which are schematically indicated by a buffering circuit 324 to a respective data input of a multiplexor 326. This multiplexor is controlled by the select control signals which determine a 3-bit select code to allow for a 1-out-of-8 selection. This selection arrangement shows that by means of the headers 320 and 320', eight different transmission speeds can be preselected in accordance with system requirements assuming that not more than eight types of subscribers with different transmission speeds connected to an installed central exchange are connected to use the distortion test service. Of these pre-selected eight transmission speeds, in turn, one transmission speed is selected in accordance with the set-up command received by the distortion sender. At the output side of the multiplexor 326 there is arranged a D flipflop 328 which divides the output signal of the multiplexor 326 by 2 and generates a ×100 clock signal which is used by control logic of the distortion sender.

In a similar manner, the ×16 signals are preselected by the headers 322 and 322' and are furnished to a second multiplexor 330 across a buffering circuit 332. The second multiplexor 330 is controlled by the same bit combination specified by the select control signal and generates the selected ×16 clock signal utilized to control the operation of the data UART's 308 and 312 shown in FIG. 4.

Figure 6:
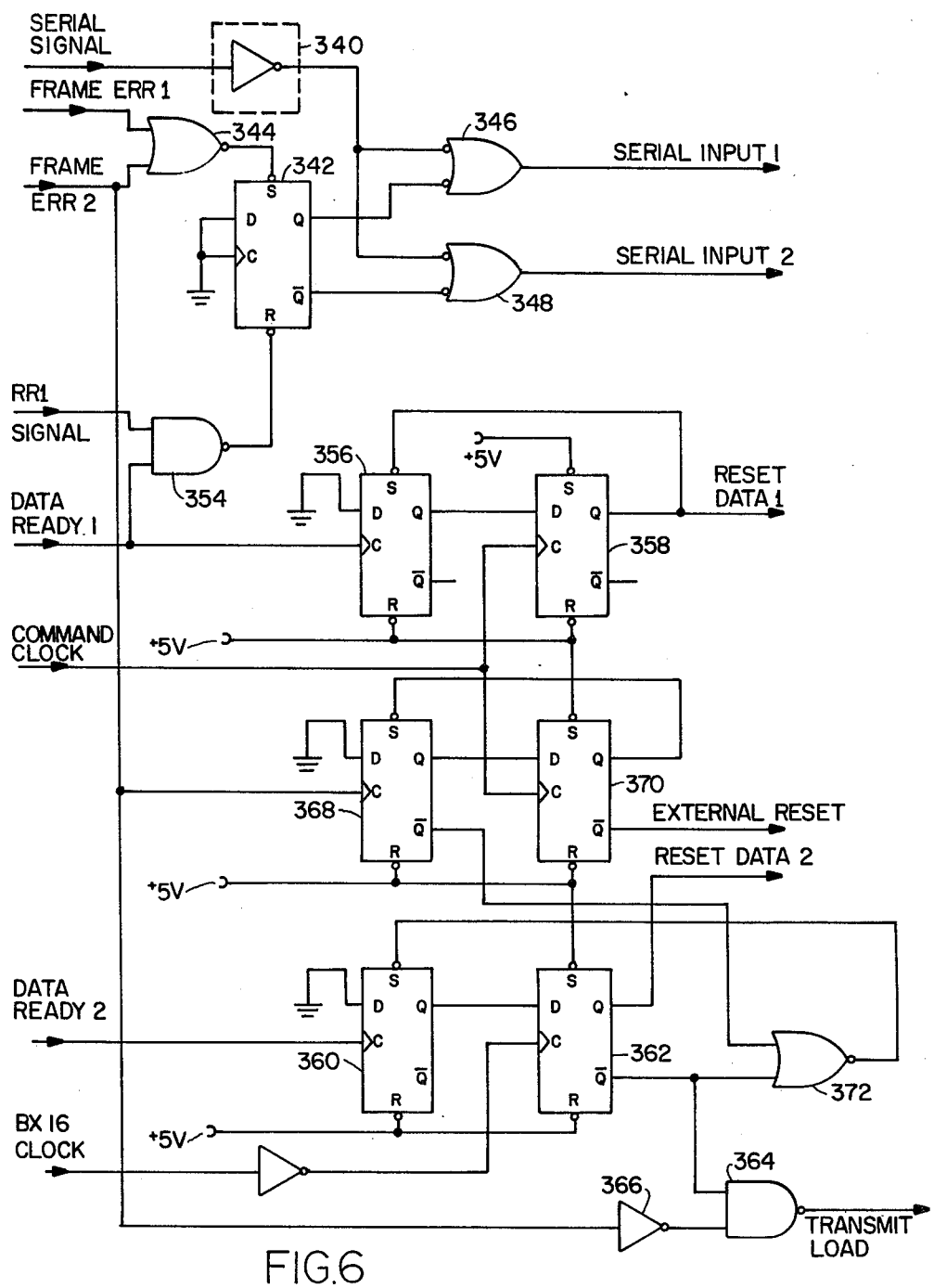
FIGS. 6 and 7 represent the circuit diagrams of a further section of the distortion sender, the input control unit.
Figure 7:
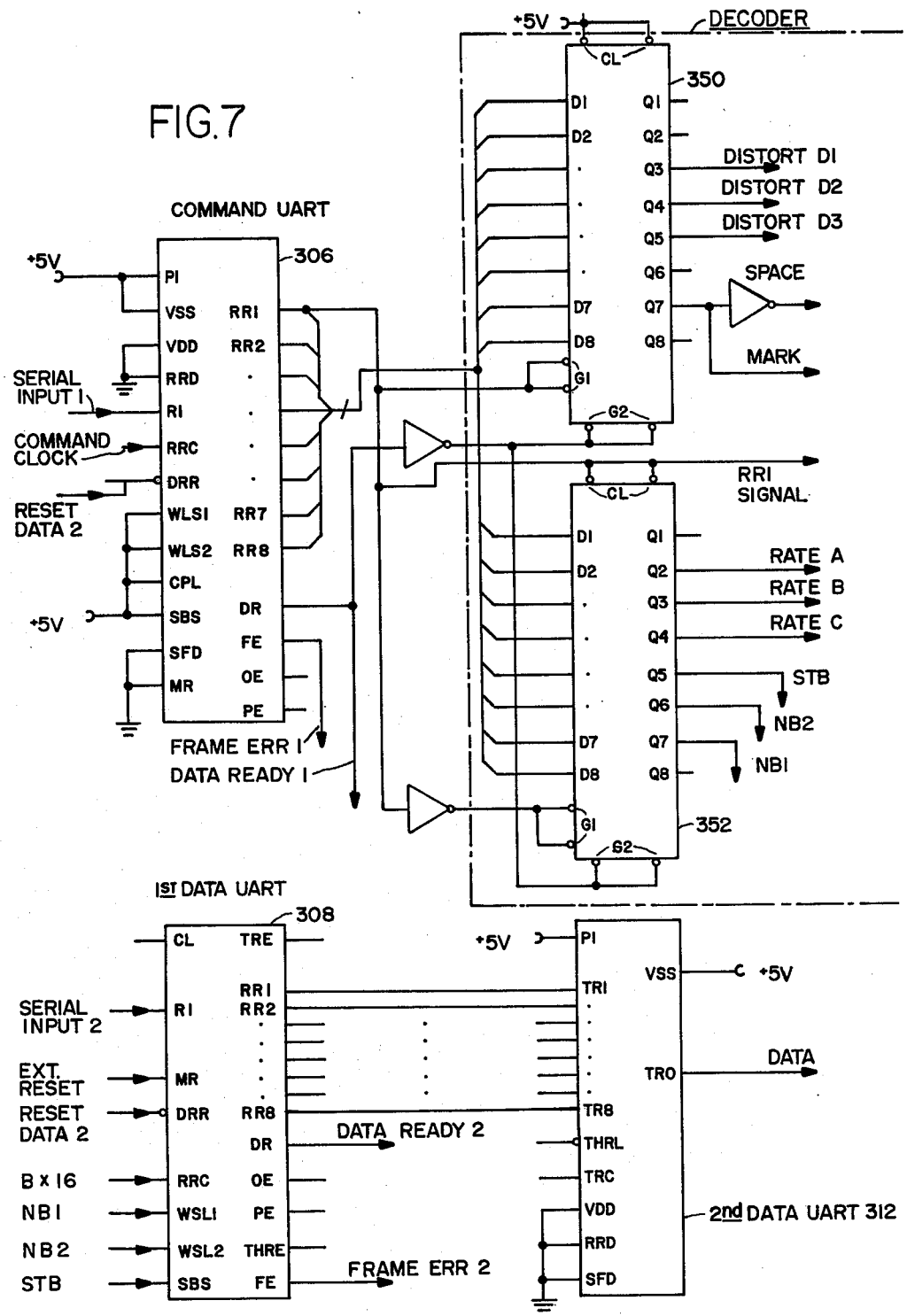

FIG. 6 represents a detailed circuit diagram of the input control unit 304 and FIG. 7 shows a corresponding schematic of the receiver/transmitter and decoding sections of the distortion sender. Since the operation of these sections of the distortion sender are closely related to each other, FIGS. 6 and 7 of the drawings will be commonly described in the following.

The input control unit 304 is provided with a serial signal input connected to the distortion sender's line terminator and receives at this input a serial data signal which is furnished to an input converter 340. It may be noted that this input converter may be simply an inverter, as shown, or if the serial input signal is other than a TTL level signal, a conventional converter may be utilized which clips the incoming signal by means of clipping diodes before converting the same to TTL levels by means of a conventional interface circuit. This signal is the general input signal of the distortion sender and can comprise both set-up commands for the distortion sender and data to be distorted.

Figure 8:
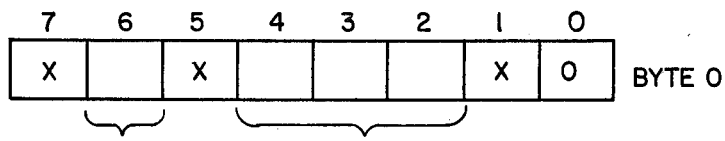
FIG. 8 represents in the form of a schematic the format of control commands generated by the central processing system and sent to the distortion sender in order to adjust this sender to generate distorted data showing a predetermined distortion level.
Figure 8:
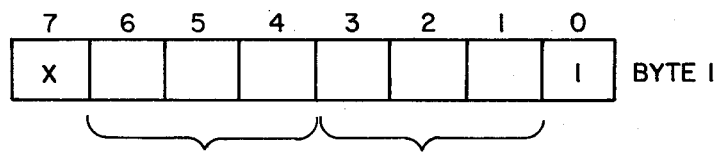

Distortion sender command codes are represented in FIG. 8 showing that a command comprises two bytes. The least significant bit positions of both bytes identify the respective byte. The bit positions "1", "5" and "7" of the lower byte are disregarded and comprise no useful information. The status of bit positions "2", "3" and "4" determine, in combination, the distortion level, whereas the respective status df the bit position "6" specifies either late or early distortion. The high byte of a distortion sender command determines by means of bit positions "1", "2" and "3" the retransmission baud rate which is the characteristic baud rate of the requesting subscriber. Bit positions "4", "5" and "6" specify, in combination, the code level and the number of stop bits which are predetermined by the transmission characteristics of the requesting subscriber.

As will become more apparent later, an incoming serial signal is recognized as a command as long as both the command UART 306 and the data UART 308 do not generate a frame error signal, these control signals are referenced "FRAME ERROR 1 and FRAME ERROR 2", respectively. In this case, D flipflop 342 is set by means of an enabled NOR gate 344 which receives the frame error signals. Both outputs of the D flipflop 342 are connected to respective inputs or two inverted OR gates 346 and 348, respectively. The second inputs of these OR gates are commonly connected to the output of the input converter 340 to receive the converted serial input signal. Under control of the D flipflop 342 these inverted OR gates 346 and 348 are alternately enabled to transmit the serial input signal either to the command UART 306 or the first data UART 308.

When a command is received, the D flipflop 342, as mentioned above, is set and the serial input signal is carried to the command UART 306. Each universal asochronous receiver transmitter device has a built-in buffer register which buffers at least a complete character. The outputs RR1 through RR8 of the receiver register furnish the first command byte in parallel. When the complete byte has been received, a data ready output DR goes high and generates a control signal DATA READY 1. This signal enables a first 8-bit latch 350 of the decoder 340 to receive the data furnished at eight data inputs D1 through D8 if the bit "0" position of the command byte currently being stored in the command UART 306 and accordingly a control signal RR1 SIGNAL are low. Corresponding operation takes place when the second command byte is available at the outputs of the receiver buffer register of the command UART 306, the only difference being that the control signal RR1 SIGNAL being high, enables the data inputs of the second decoder latch 352 to recognize the furnished command byte.

At this time, the control signal DATA READY 1 and the RR1 SIGNAL are both high and the D-flipflop 342 of the input control unit (FIG. 6) is reset by means of a NAND gate 354 connected to receive these control signals. The reset condition of the D-flipflop 342 enables the second inverted OR gate 348 to pass the subsequent serial input data to the first data UART 308. Simultaneously, the command UART 306 is disabled because the output of the first inverted OR gate 346 is low. The data which are now being fed to the first data UART 308 can be anything as long as it fulfills the predetermined data format and code as specified by the second command byte. These data originate in the central processor 10, are passed through the communications controller, will subsequently be distorted in the distortion sender and then be passed on to the requesting subscriber.

The input control unit 304, furthermore, is designed to align the asynchronously received serial input data stream with the internal time pattern of the distortion sender 50. This alignment is achieved by means of three pairs of D-flipflops. One pair of D-flipflops 356 and 358 is associated with the command UART 306. D-flipflop 358 is preset to its normal state (Q=high), but primed by its input D being low to be triggered into its reverse state (Q=low) as soon as the output signal DATA READY 1 of the command UART 306 goes high. This condition, in turn, primes the second D-flipflop 358 of the pair to assume its reverse state upon recognizing the rising edge of the next control pulse COMMAND CLOCK. When accordingly its output Q goes low a control signal DATA RESET 1 is generated which resets the output signal DATA READY 1 and causes the D-flipflop 356 to resume its normal state. Consequently, the connected D-flipflop 358 switches in its normal state upon occurrence of the next control signal COMMAND CLOCK. The settings of the D-flipflops 356 and 358 remain unchanged until a subsequent output signal DATA READY 1 arises.

In a similar manner, a second pair of D-flipflops 360 and 362, respectively is controlled by an output signal DATA READY 2 generated by the first data UART 308. This pair of D-flipflops furnishes a control signal DATA RESET 2 for resetting the data line of the associated receiver/transmitter circuit in synchronism with the clock signal B×16. In addition, the reverse condition of the D-flipflop 362 is utilized to generate a strobe pulse which when low enables to load the buffered data byte into a transmitter holding register of the second data UART 312. This strobe TRANSMIT LOAD is generated by means of a NAND gate 364 which is enabled by means of an inverter 366 as long as the first data UART 308 does not furnish an error signal FRAME ERROR 2.

This error signal occurs when a data character received at the first data UART 308 does not correspond to the code as specified by the previous set-up command. This frame error condition is artificially created in the serial input data stream sent to the distortion sender 50 by the central processor 10 in order to identify the end of a message. The error signal FRAME ERROR 2 sets the D-flipflop 342 into its normal state and thereby enables subsequently received serial data to be forwarded to the command UART 306.

Furthermore, the error signal FRAME ERROR 2 triggers the operation of a third pair of D-flipflops 368 and 370 in a similar manner as described above in conjunction with the operation of the D-flipflops 356 and 358. The error signal FRAME ERROR 2 causes a high condition at the inversed output $\bar{Q}$ of the D-flipflop 370, thereby providing a control signal EXTERNAL RESET which is a general reset signal for the first data UART 308. In addition, by means of a further NOR gate 372 the signal conditions at the inverse outputs $\bar{Q}$ of D-flipflop 362 and 368 are logically linked to the preset input S of D-flipflop 360, thereby restoring the initial condition of the second pair of D-flipflops. In summary, the design of the input control unit allows to route incoming serial data, either to the command section or the data section of the receiver/transmitter circuits and to align the input data stream to the internal time pattern of the distortion sender 50.

Figure 9:
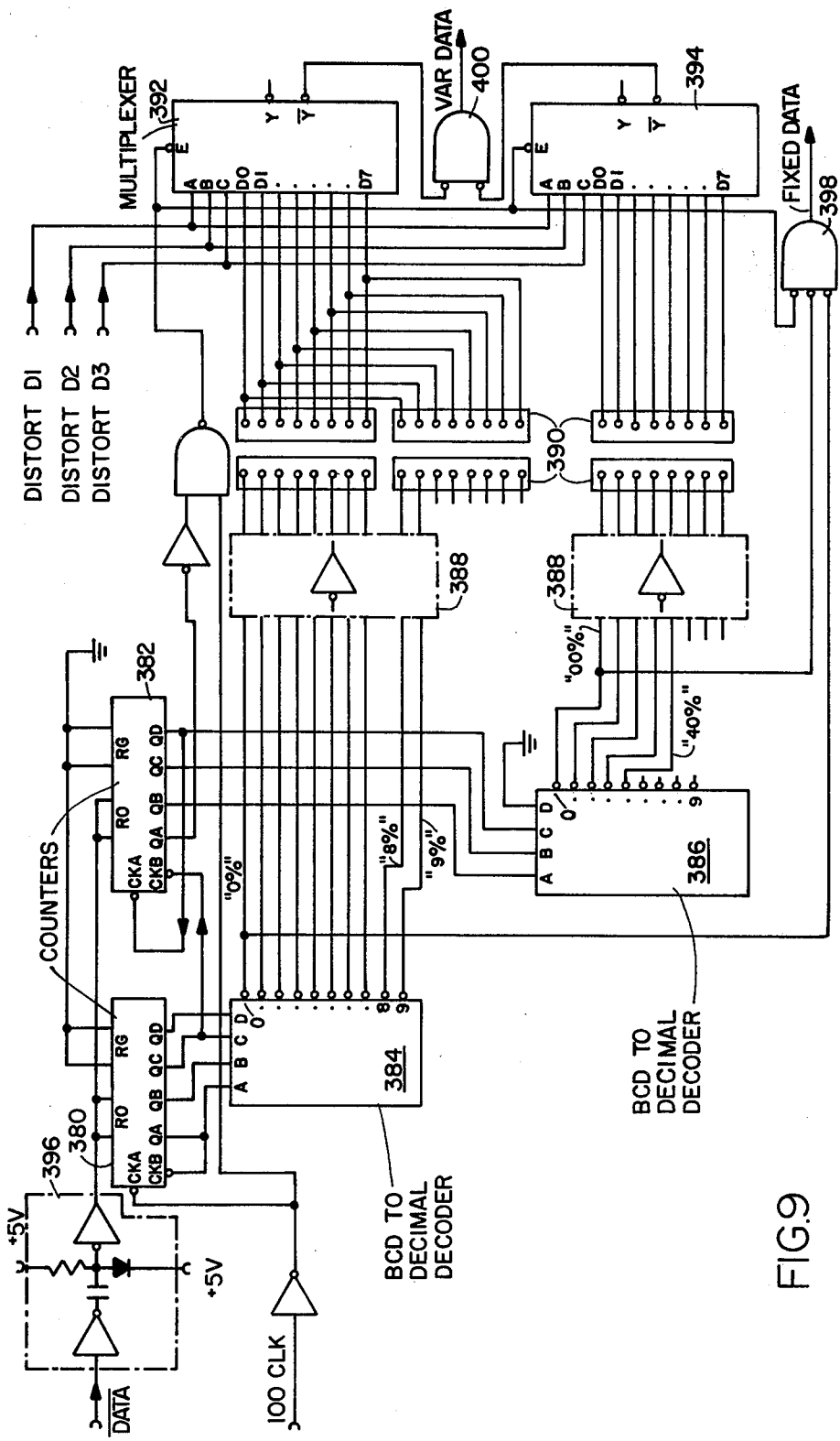
FIG. 9 represents a circuit diagram of a distortion level select and control logic of the distortion sender.

The Distortion Level Select Control Logic (FIG. 9)

In the foregoing it was described that the data UART's 308 and 312 generate a serial stream of undistorted perfect data that will subsequently be distorted by the data distortion logic 316. This logic section of the distortion sender 50 is controlled by the distortion level select and control logic 314 which is shown in more detail in FIG. 9. This section of the distortion sender is basically controlled by the clock signal ×100 CLOCK generated by the clock select unit 302. This clock signal is divided-by-10 by a first clock divider circuit 380 and then again divided-by-1 by a second clock divider circuit 382.

These two clock dividers are commercially available binary counter circuits, such as SN 74 LS 90's manufactured by Texas Instruments. Each of these clock divider circuits is associated with a respective one of two selector circuits 384 and 386, respectively. These selectors decode the furnished clock divider output signals into time units designated by input levels "0" through "9" and into tens of units designated by input levels "00" through "40". This scheme allows for logically selecting input levels "00" through "49" by an appropriate selection. Each level determines a specific distortion level within the range from 0% through 49% distortion. A distortion level beyond 49% is meaningless. Each of the output signals of the selector circuits 384 representing input levels "0" through "9" are furnished across buffering stages 388 and headers 390 to respective data inputs of a multiplexor unit 392. Correspondingly, the useful output signals of selector circuit 386 are carried to respective data inputs of a further multiplexor unit 394. Similar input circuitry of multiplexors comprising buffering stages and hand-wired headers has already been described with respect to the selection design provided in the clock select unit described in conjunction with FIG. 5. A more detailed description of the selection scheme shown in FIG. 9 is, therefore, deemed not to be necessary. But it may be noted that in this preferred embodiment the recommended distortion levels are 00, 10, 20, 25, 30, 35, 40 and 44% early or late distortion.

This circuit arrangement now is operated in accordance with the serial data stream generated by the second data UART 312. This data stream is recognized in the distortion level select and control logic 314 in inverted form as designated by the reference $\overline{\text{DATA}}$ and fed to a pulse circuit 396 which includes two inverters connected to each other across an RC circuit and a clipping diode. This pulse circuit is triggered by a mark-to-space transition of the serial input data and furnishes a corresponding output signal which resets both the clock divider circuits 380 and 382 controlling the counting operation of these divider circuits to start at all zeros exactly in synchronism with a mark-to-space transition of the serial input data. More specifically, when the data input signal $\overline{\text{DATA}}$ goes high, the reset inputs RO of both clock divider circuits 380 and 382 are pulsed high and the clock divider circuits are reset. This resetting enables both output multiplexors 392 and 394 and, in addition, yields a data output FIXED DATA across an activated AND gate 398. This AND gate 398 is activated only when the enable signal for the output multiplexors 392 and 394 derived from the clock signal ×200 CLOCK and the least significant output $Q_A$ of the second clock divider circuit 382 is present in combination with the occurrence of low level output signals "0" and "00" of the selector circuits 384 and 386. The output signal FIXED DATA thus comprises the perfect undistorted data.

The input levels received at the selector circuits 384 and 386, respectively, are selected under control of the distortion level signal. The distortion code is specified by the previous set-up command which is decoded by the decoder 310. FIG. 8 shows in conjunction with the command format the 3-bit combination of the distortion code comprising bits D1, D2 and D3, respectively. This bit combination is received by the selector circuits 384 and 386 and is referred to in FIG. 9 as DISTORT D1 through DISTORT D3. This 3-bit signal determines the selecting operation of the selector circuits and correspondingly the selected respective input levels are made available at outputs $\bar{Y}$. Both multiplexor outputs $\bar{Y}$ are connected to inverted inputs of a further AND gate 400 to provide for the further output signal VARIABLE DATA.

Figure 10:
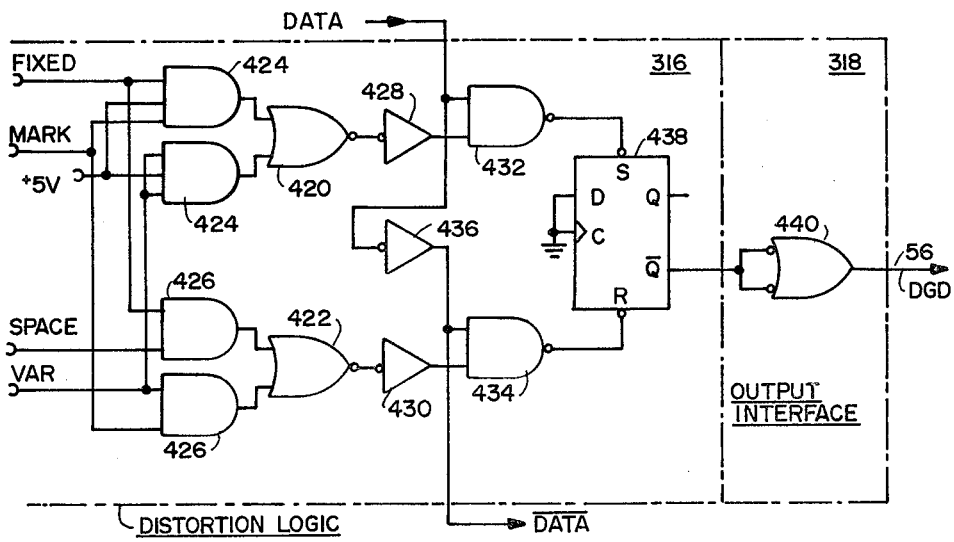
FIG. 10 shows a circuit diagram of remaining sections, a distortion logic unit and an output interface of the distortion sender.

The Distortion Logic and Output Interface (FIG. 10)

The output signals of the distortion level select and control logic form control input signals to the distortion logic 316 which is shown in FIG. 10 together with the output interface 318. The distortion logic comprises two further NOR gates 420 and 422, respectively, which act as selectors. These selectors receive the previously generated signals FIXED DATA and VARIABLE DATA and determine whether the input data will have mark or space distortion depending on whether the input signals MARK or SPACE received from the decoder 310 are in logic level "1".

These signals controlling early or late distortion are logically linked to the control input signals FIXED DATA and VARIABLE DATA by a set of AND gates 424 and 426 arranged at the input side of the NOR gates 420 and 422, respectively. Each of the output signals of a respective one of the NOR gates 420 and 422 is inverted by respective inverters 428 and 430 and carried to one input of respective NAND gates 432 and 434. These NAND gates are utilized for linking the distortion control information with the undistorted input data received from the second data UART 312. The NAND gate 432 receives the undistorted serial data stream DATA in normal signal condition, whereas, the corresponding NAND gate 434 is furnished with these data across an inverter 436 to receive inverted signals $\overline{DATA}$. The output signals of these NAND gates 432 and 434 control setting and resetting, respectively, of a further D-flipflop 438, thereby generating an output signal comprising data which are distorted according to the preset value of distortion as defined by the control signals FIXED DATA and VARIABLE DATA. The mark and space data contents of the serial data stream remain unchanged; only the edge positions are distorted.

The output signal of the D-flipflop 438 is carried to the output interface comprising an output driver 440 which sends the distorted data to the communications controller across the distortion generator data bus 56.

In the foregoing, the timer 54 and the distortion sender 50 of the distortion system have been described in detail. It has become apparent that the distortion sender is designed to receive control information from the central processor 10 across the communications controller comprising set-up commands and a message text to be distorted as specified in the previous command. The message in itself can be of any desirable length and may comprise any type of information as long as the preset data format concerning codes and level is not violated. The distortion sender 50, furthermore, is designed to distort the incoming message as specified by the set-up command. Distortion levels can be selected from 0% distortion to 49% distortion, that is, the distortion sender can provide undistorted data and distorted data as well across the distortion generator data bus 50 to any requesting subscriber. In this manner, all subscribers simultaneously requesting distortion service, if of the same kind - that is having the same transmission characteristics - can receive the distorted data simultaneously.

It is conceivable that the distortion receiver 52 analyzes received distorted data when programmed accordingly by the central processor 10. However, a detailed description of this section of the distortion system is deemed not to be necessary since the analysis of distorted data is not of concern in conjunction with the present invention.

The Multi-Address Service

The described optional feature of an electronic digital telecommunication system is designed such that it can be used for generating any kind of distorted data as requested by a subscriber for testing purposes and for transmitting undistorted data to a plurality of subscriber stations at the same time, which is in contrast to the setup of a normal call connection which provides for temporary communication links just between pairs of subscribers.

The main advantage is that this optional subsystem which is used for low priority testing purposes comprises all hardware such that it can be utilized to provide an additional high priority multi-address service without any additional outlay. The only limitation is that the subscribers which want to participate in such a service have to be connected to the distortion generator data bus 56.

There are just some minor adjustments and measures to be provided in the telecommunication system for establishing such service. Assuming only a limited number of subscribers should be authorized to use such a multi-address service, an access authorization code has to be provided. This code can be checked in a conventional manner by line terminators and line terminator groups, respectively. Such a request code specifying this kind of service is necessary anyway to alert the central processor 10 of such a requested service. The central processor 10 has to respond to this request in such a manner that this message is transmitted via the sender line terminator 58 associated with the distortion sender 50 across the distortion generator data bus 56. It may be understood that establishing such a connection link in forward direction is achieved by procedures corresponding to those used during a normal call set-up with the understanding that for a multi-address service connection the sender line terminator 58 is always selected as the called line terminator.

One exception may be that subscribers which are to receive the multi-address message may be busy during the call set-up phase. Since it is assumed that such a message takes high priority and each subscriber entitled to receive such a message should in fact receive it, it may be necessary to cancel any other current connection of a requested subscriber. The called subscriber of an interrupted connection will interpret such a cancellation as a normal clear down by the calling subscriber and the calling subscriber will receive a record concerning the chargeable time and possibly an indication of the reason of the cancellation.

After a predetermined guard time which is conventionally used in the telecommunication system during the clear down, all subscribers entitled to receive a multi-address message and currently not being out of service are connected to the distortion generator data bus 56 by sending a corresponding command across the communications controller to the control logic unit 22 of each of the respective line terminators. The central exchange checks the status of such a selected receiving subscriber after a predetermined response time and proceeds to select a subsequent one of the subscribers entitled to receive multi-address messages when this status information is correct. In this manner, all subscribers one after another are connected to the distortion generator data bus 56 until the entire group of subscribers has been reached. At this time the requesting subscriber receives a call-connect signal from the central exchange and starts thereafter to transmit its message. The message is routed via the central communications hardware and redirected to the line terminator 58 associated with the distortion sender 50. The distortion sender is programmed by the central processor 10 to transmit this message in an undistorted manner by means of the second command byte heading this message which specifies 0% distortion. This transition procedure is supported entirely by the normal control procedures generated by the central exchange for normal call connections which is made possible by the off-line design concept of the distortion subsystem. From the systems point of view, the line terminator 58 associated with the distortion sender 50 operates as a line terminator of a cross-connected subscriber and the distortion generator data bus 56, the vehicle to reach all receiving line terminators, needs no special attention or control. In other words, the simultaneous information transfer is not recognized by the central exchange during the call-connect phase. This is reflected by the fact that called subscribers cannot go "on-hook" during the call-connect phase. A clear-down of the multi-address transfer is always initiated by the calling subscriber and performed by the central exchange.

The concept of this multi-address service also allows for setting up temporary communication links of a calling subscriber with only selected ones of the group of receiving subscribers designed to receive multi-address service. Such a message transfer can again be initiated in the same manner by a calling subscriber authorized to request such a service. An individual dial code alerts the central processor 10 which initiates thereupon a program routine designed to retrieve only the addresses of predetermined subscribers from a data base. The central processor 10 commands the communications controller to send out respective control information to the selected line terminators associated with the subscribers to be connected and induces thereby, as described hereinbefore, each addressed line terminator to connect itself to the distortion generator data bus 56.

There has thus been shown and described a novel multi-address arrangement of a digital telecommunication system which fulfills all the objects and advantages sought therefore. Many changes, modifications, variations and other uses and applications of the subject invention will, however, become apparent to those skilled in the art after considering the specification and the accompanying drawings, which disclose a preferred embodiment thereof. All such changes, modifications, variations and other uses and applications which do not depart from the spirit and scope of the invention are deemed to be covered by the invention which is limited only by the claims which follow.

What is claimed is:

1. In a digital data telecommunications system comprising a central switching system and a plurality of line terminators each connecting the switching system to a pair of incoming and outgoing lines and each designed to convert serial data transmitted with various speeds and codes along the incoming and outgoing lines into formatted message characters received and emitted by the switching system, and vice-versa, wherein said switching system includes a connection control memory having storage cells each associated with a respective one of the line terminators, said cells storing control data and specifying the allocation between a calling line terminator and the respective called line terminator for the duration of the call, and said control data enabling the switching system to interconnect sequentially each calling line terminator with the respective called line terminator in a time multiplex mode for transmitting one message character at a time, the improvement constituting an arrangement for establishing multi-address connections, in combination with said central switching system, and comprising:

(1) an additional line terminator connected to receive a character of a multi-address message from a calling line terminator across the switching system, and having a serial output furnishing corresponding serial data;

(2) a distributing data base connecting said serial output of said additional line terminator in parallel to all line terminators entitled to receive a multi-address message; and (3) said line terminators entitled to receive multi-address messages including control means for alternatively enabling the respective line terminator in a single address mode to receive a message character supplied by the switching system and to convert the same into serial data for emitting the data to the respective outgoing line, and in a multi-address mode to receive serial data transmitted along said distributing data bus, respectively, for transfer to said outgoing line, wherein each line terminator includes a line interface unit having a pair of external inputs and outputs connected to the associated incoming and outgoing line, respectively, and having a corresponding pair of internal inputs and outputs, wherein said line terminator further includes means for converting serial data received on the incoming line to formatted data characters, and vice-versa, said converting means having a pair of internal inputs and outputs connected to the respective ones of said internal inputs and outputs of said line interface unit, and having external parallel inputs and outputs connected to said central switching system for receiving and transmitting, respectively, a message character, wherein said line terminator further includes means for controlling the operation of the line terminator and having control data inputs and outputs connected to receive and to transmit, respectively, control signals from and to the central switching system, and wherein each of said line terminators entitled to receive a multi-address message further comprises:

switch means arranged between the line interface unit and the converting means for alternatively connecting the internal input of the line interface unit to the internal output of the converting means and to said distributing data bus, respectively, under control of said control means.

2. The improvement as recited in claim 1, wherein the central switching system is composed of (a) a central processing system connected to receive call requests from calling line terminators and designed to generate the connection control data, and (b) a communications controller including (i) means for storing this connection control data in said connection memory, (ii) means for scanning sequentially the line terminators by commanding the respective ones of said control means of said line terminators to supply a data control signal at said control output and (iii) means for temporarily interconnecting each line terminator in a calling status to a respective called line terminator; and wherein said central processing system further comprises:

call request control means for recognizing a specific call request as a multi-address call and for initiating the setting up of multi-address connections upon receipt of this request by commanding the communications controller to transmit to each predetermined line terminator, entitled to receive a multi-address message, a corresponding control signal forcing the respective line terminator to assume the multi-address mode; said call request control means acknowledging the request of the calling line terminator after this set up operation whereupon the requesting line terminator, in turn, is enabled to start the transfer of the multi-address message.

3. The improvement as recited in claim 2, wherein said call request control means of the central processing system include means for distinguishing between different call requests, each determining a respective group of the line terminators designated to receive the respective multi-address message.

4. The improvement according to claim 1, 2 or 3, wherein the digital data telecommunications system further includes a central distortion test system forming an off-line subsystem connected to the central switching system and being designed to distort incoming serial data in accordance with various discrete distortion levels ranging from zero to full distortion under control of said central processing system, wherein said central distortion system is arranged between said additional line terminator and said distributing data bus, and wherein the subsystem is utilized for transmitting both a multi-address message and a distorted text with the difference that a multi-address message is always directed to more than one line terminator and the respective receiving line terminators are forced by the central processing system to assume the multi-address mode, whereas the transmitted distorted text is only received by a line terminator requesting such service.

* * * * *